No. 711,485. Patented Oct. 21, 1902.
J. EDMUNDS.
APPARATUS FOR MANUFACTURING SULFUROUS ACID.
(Application filed Jan. 9, 1902.)
(No Model.) 2 Sheets—Sheet 2.
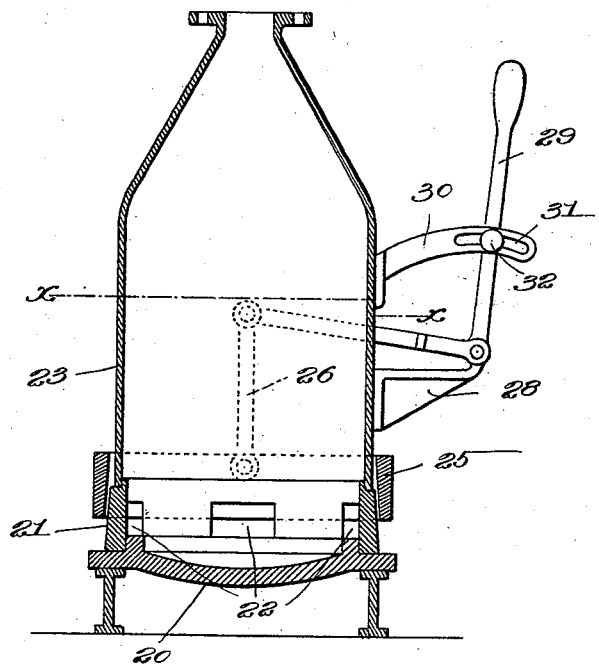
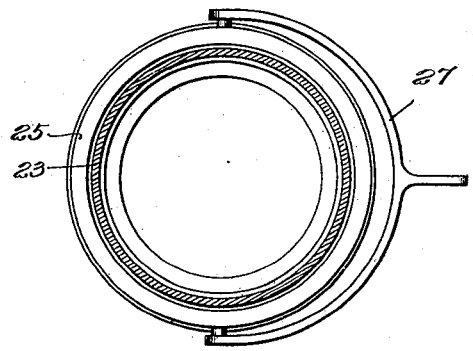
Witnesses.
Thomas J. Drummond.
Fred S. Greenleaf.
Inventor.
John Edmunds,
by Crosby & Gregory
Attys.
THE NORRIS PETERS CO., PHOTO-LITHO., WASHINGTON, D. C.

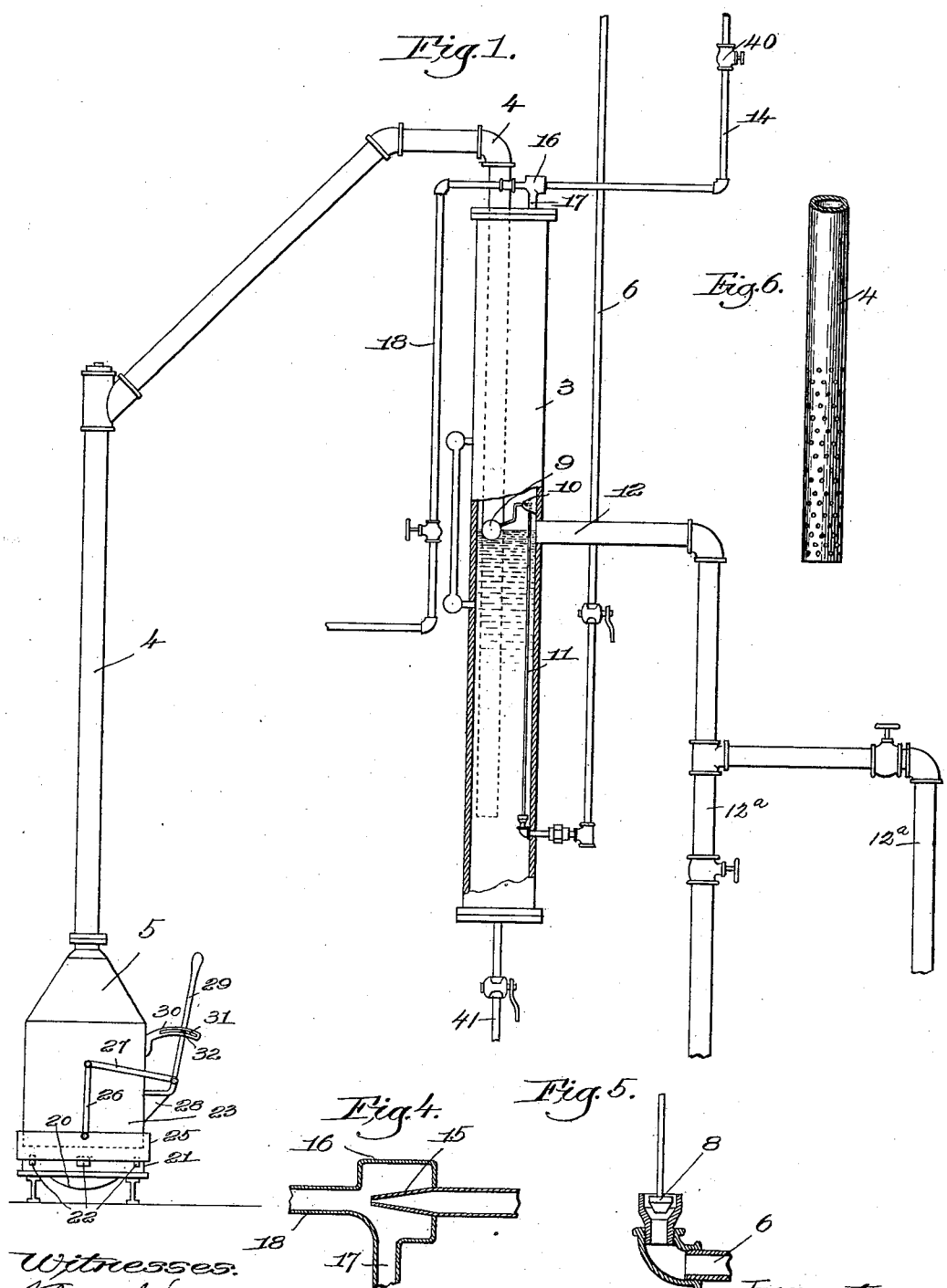

UNITED STATES PATENT OFFICE.

JOHN EDMUNDS, OF WALTHAM, MASSACHUSETTS.

APPARATUS FOR MANUFACTURING SULFUROUS ACID.

SPECIFICATION forming part of Letters Patent No. 711,485, dated October 21, 1902.

Application filed January 9, 1902. Serial No. 88,957. (No model.)

*To all whom it may concern:*

Be it known that I, JOHN EDMUNDS, a citizen of the United States, residing at Waltham, in the county of Middlesex and State of Massachusetts, have invented an Improvement in Apparatus for Manufacturing Sulfurous Acid, of which the following description, in connection with the accompanying drawings, is a specification, like numerals on the drawings representing like parts.

Sulfurous acid as used for bleaching purposes is commonly made by conducting sulfurous-acid gas or sulfur-fumes into a body of water, which, according to well-known chemical laws, will absorb about thirty times its volume of gas, the water when saturated with the sulfurous-acid gas being employed for various bleaching purposes.

It is the object of my present invention to provide a novel form of apparatus for generating the sulfur-fumes or sulfurous-acid gas and delivering it into a body of water, whereby the desired sulfurous-acid product is obtained.

My invention comprises a suitable absorption-tank having an inclosed chamber which is partially filled with water and into which extends a pipe or conduit connected to a suitable device for generating the sulfurous-acid gas. The end of the pipe extends below the surface of the water in the chamber, and a suitable exhaust apparatus is provided for creating a vacuum or partial vacuum in the chamber. As soon as the vacuum or partial vacuum is established in the chamber the sulfur-gases will be drawn through the pipe and delivered into the body of water in the tank, the said gases being absorbed by the water, according to well-known chemical laws. Suitable means are provided for maintaining the water in the tank at a substantially uniform level, and an outlet or discharge pipe communicates with the chamber at the normal water-level. As the gas is delivered from the pipe at a point below the surface of the water, it will tend to rise to the top of the water and in its upward movement will be gradually absorbed by the water. Hence the water near the top of the body of water will be most thoroughly saturated with the gas, and as the volume of water expands by reason of its having absorbed large quantities of gas the water at the top of the body of water in the tank will flow out through the discharge-outlet.

The construction of the furnace for burning the sulfur and of the connection between the furnace and the absorption-tank are such that none of the sulfur-gases escape into the air, and it is possible, therefore, to use my apparatus at any place without danger of surrounding objects being injured by escaping sulfur-fumes.

Referring to the drawings, Figure 1 shows a general view of my improved apparatus. Fig. 2 is a vertical section of the furnace employed. Fig. 3 is a section on the line $x\,x$, Fig. 2. Fig. 4 is a detail showing one form of exhaust apparatus. Fig. 5 is a detail of the automatic valve, and Fig. 6 is a detail hereinafter described.

3 designates the absorption-tank, which may be of any suitable size and shape and which for convenience has been illustrated in this embodiment of my invention as a long cylindrical body forming an inclosed chamber. Entering the top of the chamber is an inlet-pipe 4, the end of said pipe extending, as shown in Fig. 1, nearly to the bottom of the chamber and being perforated, as shown in Fig. 6, the said pipe 4 leading to and connecting with a suitable furnace 5, to be presently described, in which the sulfur-gases are generated. A suitable inlet-pipe 6, connecting with any usual or convenient source of water-supply, enters the tank 3 near the lower end thereof and serves to conduct water to said tank.

When in operation, the tank will be partially filled with water, as shown in Fig. 1, the level of the water being some distance above the lower end of the inlet-pipe 4, whereby the end of the pipe is immersed in the water, and I will preferably provide means for automatically maintaining the water at a substantially uniform level. Any suitable means may be employed for this purpose; but for convenience I have illustrated a valve 8, controlling the opening at the end of the water-inlet 6, which valve is controlled by a suitable float 9. For this purpose the float 9 is pivoted to a bracket 10 on the interior of the casing and has connected to one end of its arm the stem 11 of the valve, the construction being such that when the water-level rises the valve will be lowered and forced against its seat by reason of the buoyancy of the float, while when said water-level is lowered the float drops and the inlet-valve is opened. I would state, however, that any other suitable mechanism for maintaining a uniform water-level may be employed without departing from the spirit of my invention.

12 indicates the discharge or outlet pipe, which is connected to the tank at substantially the normal water-level therein, as shown in Fig. 1, and which conducts the water saturated with the sulfurous-acid gas to the tanks or other places in which it is to be used by means of pipes 12ª.

The sulfur fumes or gases are drawn through the inlet 4 into the water by means of an exhaust apparatus, and in the drawings I have illustrated one convenient form of such apparatus, it being in the nature of a steam siphon or ejector.

A pipe 14, connected with any suitable source of steam-supply having sufficient pressure, has a nozzle 15 at its end which extends into a suitable exhaust-chamber 16, said chamber being connected by pipes 17 with the vacuum-chamber and having a discharge or exhaust pipe 18 in line with the nozzle 15. The action of this exhaust apparatus will be readily understood by those skilled in the art, and it will be merely necessary to say, therefore, that when steam under pressure is delivered through the discharge-nozzle 15 the force of the issuing steam creates a partial vacuum in said chamber 16, and thereby exhausts the air from the vacuum-chamber 3. The pipe 14 has a valve 40 therein by means of which the pressure of the steam issuing from the nozzle 15 may be controlled, and thereby the amount of vacuum created in the absorption-tank. By thus controlling the amount of vacuum the force of the draft through the inlet-pipe 4 is regulated, and consequently the amount of sulfur which is drawn into the water. Where comparatively little of the sulfurous-acid liquor is being used, the valve 40 will be partially closed, and when the demand for the liquor is greater the valve may be opened wide enough to establish a sufficient draft through the inlet-pipe to draw into the water the required amount of sulfur-gases. The strength of the sulfurous-acid liquor may also be varied by varying the amount of the vacuum, for it will be obvious that with a certain amount of water in the tank the strength of the liquor depends upon the amount of sulfur-gases absorbed by the water, and by varying the amount of the gases delivered to the water the strength of the liquor may be varied.

41 designates any suitable draw-off pipe by means of which the absorption-tank can be emptied of water for cleaning or other purposes.

The furnace which I have illustrated comprises a hearth 20, on which is supported an annular base portion 21, having a series of draft-openings 22 therein. The body proper 23 of the stove may be of any suitable construction and is supported upon the base portion 21, the upper end of said body having a tight connection with the pipe 4. When now sulfur is placed upon the hearth 20 and the sulfur is ignited and the exhaust apparatus is set in operation to exhaust the air from the absorption-tank, the vacuum therein will establish a draft through the furnace 5 and inlet-pipe 4, and the sulfur-gases therefore will all be drawn through the pipe 4 and delivered through the apertured end of said pipe into the body of water. The said gases, which is sulfurous-acid gas, will be readily absorbed by the water, as will be understood, that portion of the water which is most completely saturated being at the top in position to flow out or be discharged through the discharge-pipe 10. The float-valve is so arranged that the normal water-level has such a relation to the discharge-opening that when the water-level falls to the level of the discharge-opening the valve 8 will be slightly opened to admit fresh water. I have also provided means whereby when it is desired to stop the production of the sulfurous acid the fire in the furnace may be choked and put out almost instantly. Accordingly I have provided a damper-ring 25, surrounding the base portion 21 and which may be dropped over the draft-openings 22 and shut off the supply of air.

To make the draft-ring practically air-tight, the base portion 21 is provided with a tapering or conical exterior surface, as seen in Fig. 2, and the draft-ring 25 has a corresponding interior surface, so that when the draft-ring is lowered the supply of air is entirely cut off, and the fire will accordingly go out, since combustion cannot be maintained. The ring is shown as supported from a yoke member 27 by means of links 26, the said yoke member being pivoted to a suitable bracket 28 and having an operating-arm 29. A suitable segment 30, carried by the stove or any other support, has a slot 31 therein, in which plays a binding-screw 32, carried by the lever 29. By operating the lever 29 the draft-ring may be raised or lowered to any desired position, and by means of the clamping-screw 32 it may be maintained in such position.

It will be observed that since the sulfur-gases are drawn from the furnace into the body of water, where they are all absorbed and utilized in the making of the sulfurous-acid liquor, there is no chance for any of the sulfur-gases to escape into the air, and consequently my apparatus may be employed in any place without any danger of surrounding objects being injured by sulfur-gases.

While I have herein disclosed one convenient form of my invention, yet I do not desire to be limited thereto, as the details of construction may be varied without departing from the invention as expressed in the appended claims.

Having described my invention, what I claim, and desire to secure by Letters Patent, is—

1. In an apparatus of the class described, a furnace, an absorption-tank having an inlet to admit water thereto and an outlet for the sulfurous-acid liquor situated above the inlet, a pipe connected to the said furnace and extending into the said tank, said pipe having its end below the outlet, means to draw the sulfur-gases from the furnace into the said tank, and means to regulate the amount of water admitted to said tank proportionally to the amount of sulfurous-acid liquor which is delivered from the tank.

2. In an apparatus for making sulfurous acid, means to generate sulfur-gases, an absorption-tank having an inlet to deliver water thereto, and an outlet for the sulfurous-acid liquor, means to deliver sulfur-gases into the tank at a point below the outlet, and automatic means to vary the amount of water delivered to the tank proportionally to the amount of sulfurous-acid liquor delivered therefrom.

3. In an apparatus for making sulfurous acid, a furnace in which sulfur may be burned, an inclosed chamber having an inlet to admit water near the bottom, and an outlet for the sulfurous-acid liquor situated above the inlet, a pipe connected with the furnace and extending into the chamber, the end of said pipe being situated some distance below the outlet, and means to create a vacuum or partial vacuum in said chamber.

4. In an apparatus for making sulfurous acid, a sulfur-burner, an absorption-tank having an inlet to admit water thereto, and an outlet for the sulfurous acid situated above the inlet, a pipe to conduct the sulfur-gases into said tank, said pipe having its discharge end below the level of the outlet, and an automatically-operated valve to regulate the flow of water through the inlet.

5. In an apparatus for making sulfurous acid, an absorption-tank adapted to be partially filled with water, an automatic valve to maintain the water at a substantially uniform level, a conduit extending into the tank, and having its end below the level of the water, and an exhaust apparatus to maintain a vacuum or partial vacuum in said tank.

6. In an apparatus of the class described, an absorption-tank adapted to be partially filled with water, means to automatically maintain the water at a substantially uniform level, an outlet at substantially the normal water-level, a pipe extending into the tank, and having its end below the level of the water, and an exhaust apparatus to maintain the vacuum in said tank.

7. In an apparatus for making sulfurous acid, a furnace to generate sulfur-gases, an absorption-tank adapted to be partially filled with water, an inlet to deliver fresh water to said tank, an outlet for the sulfurous acid situated above the inlet, a pipe connecting said furnace with the said tank, the mouth of the pipe being situated below the inlet, and a float-valve controlling the admission of water through the inlet and operating to automatically maintain the water-level at substantially the level of the outlet.

8. In an apparatus for making sulfurous acid, a furnace having draft-openings at its lower portion, a vertically-movable damper-ring surrounding the furnace and adapted to open and close said draft-openings, an absorption-tank partially filled with water, and means to conduct the sulfur-gases from the furnace into the water in the tank.

9. In an apparatus for making sulfurous acid, a furnace having a base portion provided with a conical exterior surface, draft-openings through said base portion, a damper-ring having its interior surface to fit said conical base portion, means to raise and lower said ring, said ring in its raised position opening and uncovering the draft-openings and in its lower position closing the same, and means to conduct the gases generated in said furnace into a body of water.

10. In an apparatus for making sulfurous acid, a vertically-arranged cylindrical chamber, means to admit water to the lower end thereof, a furnace, a pipe connected to the furnace and entering the top of the chamber, the end of the pipe extending nearly to the bottom of said chamber, an outlet situated above the inlet, a float-valve controlling the admission of water through the inlet and operating to maintain the water-level at substantially the level of the outlet, and means to create a vacuum in said chamber whereby the sulfur-gases are drawn into the water and are absorbed therein, and the sulfurous acid thus generated is delivered through the outlet.

11. In an apparatus for making sulfurous acid, a furnace, an absorption-tank, means to conduct the sulfur-fumes from the furnace into the tank, an inlet to deliver water to said tank, automatic means controlling the supply of water delivered to the tank, whereby the liquor in the tank is maintained at a substantially uniform level, exhaust apparatus connected to the tank, and creating a sufficient vacuum therein to draw the sulfur-fumes into the tank, and means to vary the amount of the vacuum whereby the strength of the sulfurous liquor may be varied.

In testimony whereof I have signed my name to this specification in the presence of two subscribing witnesses.

JOHN EDMUNDS.

Witnesses:
 LOUIS C. SMITH,
 GEO. W. GREGORY.